United States Patent
Freedman

(10) Patent No.: US 6,294,236 B1
(45) Date of Patent: *Sep. 25, 2001

(54) TAMPER EVIDENT LABELS AND METHODS OF PRODUCING THE SAME

(75) Inventor: Melvin S. Freedman, Beachwood, OH (US)

(73) Assignee: Avery Dennison Corporation, Pasadena, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/916,611

(22) Filed: Aug. 22, 1997

Related U.S. Application Data

(62) Division of application No. 08/677,886, filed on Jul. 10, 1996, now Pat. No. 5,876,816.

(51) Int. Cl.⁷ ...................................................... B65D 5/43
(52) U.S. Cl. ................... 428/40.1; 206/459.1; 206/497; 206/807; 283/81; 283/101; 428/41.5; 428/41.6; 428/41.7; 428/41.9; 428/42.1; 428/500; 428/515; 428/520; 428/915
(58) Field of Search ................................ 428/40.1, 41.5, 428/41.6, 41.7, 41.9, 42.1, 500, 515, 520, 915; 206/459.1, 807, 497; 283/81, 101

(56) References Cited

U.S. PATENT DOCUMENTS

| | | |
|---|---|---|
| 4,721,638 | 1/1988 | Matsuguchi et al. ................ 428/40 |
| 4,746,556 | 5/1988 | Matsuguchi et al. ................ 428/40 |
| 4,837,088 | 6/1989 | Freedman ........................... 156/243 |
| 4,925,714 * | 5/1990 | Freedman .......................... 428/40.1 |
| 5,042,842 | 8/1991 | Green et al. ........................ 283/101 |
| 5,876,816 * | 3/1999 | Freedman .......................... 428/40.1 |

* cited by examiner

Primary Examiner—Nasser Ahmad
(74) Attorney, Agent, or Firm—Renner, Otto, Boisselle & Sklar

(57) ABSTRACT

This invention relates to a muitilayer tamper-evident label comprising: (A) a first and second layer of polymeric film, wherein each layer has an upper and lower surface and the lower surface of the first layer contacts the upper surface of the second layer at a separation interface, (B) a heat-sealable layer, having an upper and lower surface, wherein the lower surface of the heat-sealable layer is bonded to the upper surface of the first layer, and (C) an adhesive layer, having an upper and lower surface, wherein the upper surface of the adhesive layer is bonded to lower surface of the second layer. In another aspect the invention relates to an article overwrapped in a packaging wrap material and having the tamper evident label inside and bonded to the packaging wrap. In another embodiment, the invention relates a method of preparing a multilayer tamper evident label comprising the steps of (A) coextruding a film having a heat sealable layer, a first layer and a second layer each having an upper and lower surface, wherein the lower surface of the first layer contacts the upper surface of the second layer at a separation interface and the upper surface of the first layer is bonded to the lower surface of the heat sealable layer, and (B) forming an adhesive layer with an upper and lower surface, where upper surface of the adhesive layer is bonded to the lower surface of the second layer. The multilayer tamper evident label provides information about the integrity of the packaging. The label and method afford evidence of tampering and/or repackaging of an article.

10 Claims, 1 Drawing Sheet

TAMPER EVIDENT LABELS AND METHODS OF PRODUCING THE SAME

This is a division of copending application Ser. No. 08/677,886, filed Jul. 10, 1996, now U.S. Pat. No. 5,876,816.

TECHNICAL FIELD OF THE INVENTION

This invention relates to multilayer labels and more specifically to tamper evident multilayer labels, articles using the labels, methods of preparing the labels and methods of packaging articles.

BACKGROUND OF THE INVENTION

Tamper evident labels are used to indicate when a label or a package containing the label has been altered. A problem for retailers and consumers is tampering with packaging of an article. Often the packaged materials are altered and repackaged. This is especially a problem in the area of packaging consumer products, such as compact disks and computer software, and pharmaceuticals. It is desirable to have a label which would show that the product within the packaging had not been opened and altered.

U.S. Pat. No. 4,721,638, issued to Matsuguchi et al, relates to materials that prevent resticking. The materials have an adhesive layer, a second layer, a peeling agent layer laminated on the second layer and a first layer laminated on the peeling agent layer. The second and first layers are adhered via the peeling agent layer. Once the first layer and the second layer are separated they cannot be restuck together. These materials have uses as labels, such as price tags.

U.S. Pat. No. 4,746,556, issued to Matsuguchi et al, relates to easily breakable sticking material. The material has a surface layer, an easily breakable layer laminated to the surface layer, a first peel-off layer formed on the surface of the easily breakable layer, a second peel-off layer formed on a part of the main surface of the easily breakable layer, a covering layer and an adhesive layer. The surface layer is peeled off of the easily breakable layer and cannot be re-adhered again. These materials have use in labels, such as price tags.

U.S. Pat. No. 5,042,842, issued to Green et al, relates to labels, such as those used for preventing or detecting tampering and counterfeiting. The label is a multilayer security label which has a base layer with a permanent adhesive coated on a lower surface. Indicia or markings are applied to the bottom surface of the top layer and the top layer is laminated to the upper surface of the base layer. The top layer is laminated to the upper surface of the base layer by permanent patterned adhesive. A portion of each of the upper surface of the base layer and the bottom surface of the top layer are free of adhesive.

SUMMARY OF THE INVENTION

This invention relates to a multilayer tamper-evident label comprising: (A) a first and second layer of polymeric film, wherein each layer has an upper and lower surface and the lower surface of the first layer contacts the upper surface of the second layer at a separation interface, (B) a heat-sealable layer, having an upper and lower surface, wherein the lower surface of the heat-sealable layer is bonded to the upper surface of the first layer, and (C) an adhesive layer, having an upper and lower surface, wherein the upper surface of the adhesive layer is bonded to lower surface of the second layer.

In another aspect the invention relates to an article overwrapped in a packaging wrap material and having a tamper evident label inside the packaging wrap, wherein the tamper evident label comprises: (a) a first and second layer of polymeric film, wherein each layer has an upper and lower surface and the lower surface of the first layer contacts the upper surface of the second layer at a separation interface, (b) a heat-sealable layer, having an upper and lower surface, wherein the lower surface of the heat sealable layer is bonded to the upper surface of the first layer, and (c) an adhesive layer, having an upper and lower surface, wherein the upper surface of the adhesive layer is bonded to lower surface of the second layer and the lower surface of the adhesive layer of the label is bonded to the article and upper surface of the heat sealable layer of the label is bonded to the packaging wrap material.

In another embodiment, the invention relates a method of preparing a multilayer tamper evident label comprising the steps of (A) coextruding a film having a heat sealable layer, a first layer and a second layer each having an upper and lower surface, wherein the lower surface of the first layer contacts the upper surface of the second layer at a separation interface and the upper surface of the first layer is bonded to the lower surface of the heat sealable layer, and (B) forming an adhesive layer with an upper and lower surface, where upper surface of the adhesive layer is bonded to the lower surface of the second layer.

The multilayer tamper evident label provides information about the integrity of the packaging. The label and method afford evidence of tampering and/or repackaging of an article. The multilayer tamper evident layer reveals tampering by delaminating at the first and second layer upon application of an external force. The first layer remains adhered to the packaging through the heat sealable layer. The second layer remains bonded to the article through the adhesive layer.

DETAILED DESCRIPTION OF THE PREFERRED EMBODIMENTS

In a preferred embodiment, the present invention relates to tamper evident labels which, when applied to wrapped articles, provide a means for identifying if the packaging has been altered. Additionally, the tamper evident labels may have etchable and imprintable material to provide indicia or markings. Finally, the present invention provides a method for packaging compact disks, especially along its spline, to reveal if the packaging for the compact disks has been altered.

A critical feature of the present invention is the separation interface between the first and second layers of the multilayer tamper evident label. The term "separation interface" refers to the interface between the first and second polymeric films of the label. The films are in contact with each other and present to each other surfaces of different composition.

The films adhere to each other to a sufficiently high degree to withstand the maximum separation forces imposed as the labels are processed. However, the films adhere to each other at a low degree to allow them to cleanly and readily separate from each other under the imposition of stripping or separation forces greater than the maximum separation forces to which they have been exposed during label preparation. The separation interface has also been referred to as a "peelable interface" in U.S. Pat. No. 4,925,714, issued to Freedman, the disclosure which is incorporated by reference. The separation interface typically has a peel strength in the range of less than about 400, or from about 30 to about 200, or from about 50 to about 175 grams per 2-inch width at 90° peel.

Figure 1:
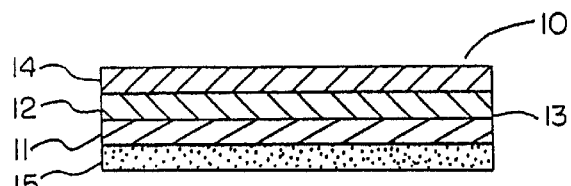
FIG. 1 is a cross sectional drawing illustrating the layers of the tamper evident label.

The embodiments of the invention are further illustrated in FIGS. 1–4. FIG. 1 illustrates the multilayer tamper evident label of the invention 10 comprising a first and second layer of polymeric film 11 and 12. The compositions of layers 11 and 12 are different. The separation interface 13 is between the upper surface of layer 11 and the lower surface of layer 12. Layers 11 and 12 may be coextruded and are each derived from at least one polyolefin. The polyolefin is generally a homo or interpolymer, e.g. a copolymer or terpolymer, of olefins containing from 2 to about 30, or from about 2 to about 12, or from about 2 to about 6 carbon atoms. Layers 11 and 12 are independently composed of polyethylene, polypropylene, polybutylene, polyethylene copolymers and terpolymers and polypropylene copolymers and terpolymers, and mixtures or two or more thereof. The polyethylene and polypropylene copolymers and terpolymers are interpolymers of ethylene or propylene together with one or more olefin monomers having from about 2 to about 12, or from about 2 to about 6 carbon atoms. Examples of the other monomers include ethylene, propylene, butene, hexene, etc. Typically the other monomer is present in an amount from about 3% up to about 20%, or from about 5% to about 19%, or from about 8% to about 18%. Preferred other monomers are ethylene and 1-butene for propylene and propylene and 1-butene for ethylene. Typically these polymers have a melt index of about 2 to about 4 g/10 min. or a number average molecular weight of about 150,000 to about 500,000. Examples of propylene copolymers include CEFOR™ resin SRD4-105 which contains 14% by weight comonomer. Other resins include polypropylene random copolymers 6C44 (5.5% ethylene), DS6D81 (5.7% ethylene), and DS6D82 (5.7% ethylene). The CEFOR™ and random polypropylene polymers are available commercially from Shell Chemical Company. Preferably layer 11 and 12 are polyethylene and polypropylene, respectively. In another embodiment, layers 11 and 12 are polypropylene and polyethylene, respectively.

In FIG. 1, layer 14 is a heat sealable polymeric layer bonded to the upper surface of layer 12. The heat sealable polymers which compose the heat sealable layer may be a polyolefin, like one of those described above, or the heat sealable polymer may include but are not limited to polyethylene methyl acrylate, polyethylene ethyl acrylate, polymethyl methacrylates, acrylonitrile butadiene styrene polymer, nylon, polybutylene, polystyrene, polyurethane, polysulfone, polyvinylidene chloride, polypropylene, polypropylene copolymers, polycarbonate, polymethylpentene, styrene maleic anhydride polymer, styrene acrylonitrile polymer, ionomers based on sodium or zinc salts of ethylene/methylacrylic, cellulosics, fluoroplastics, polyacrylonitriles, and thermoplastic polyesters. In one embodiment, the heat sealable layer is a polypropylene copolymer as described above.

In FIG. 1, an adhesive layer 15 is bonded to the lower surface of layer 11. The adhesive is pressure-sensitive adhesive such as those utilized commercially for label construction. An example of a useful pressure sensitive adhesive is available commercially from H. B. Fuller of Blue Ash, Ohio under product number HM727 (a blend of ethylene-vinyl acetate copolymer, polyethylene waxes and a tackifier). In one embodiment, the adhesive layer is covered by a release liner.

In another embodiment, the second layer 12 includes pigments or laser imagible additives. The pigments may be any of those used impart color to the composition, such as titanium dioxide, carbon black, chrome yellow, molybdenum orange, iron oxide red, etc. The laser imagible additives are known in the art. For instance, titanium coated mica may be used. The pigments and imagible additives are present in the polymeric layer at a level from about 0.1% to about 20% by weight.

In one embodiment, the multilayer tamper evident labels are prepared by coextruding a film comprising three layers: a heat sealable layer, a first layer and a second layer wherein the first and second layer are in contact at a separation interface and the first layer and the heat sealable layer are bonded together. The multilayer films are coextruded by known techniques, such as using multimanifold dies, as illustrated in U.S. Pat. Nos. 4,197,069 and 4,152,387. These patents are hereby incorporated by reference. An adhesive layer is formed on the surface of the second layer. The compositions of the polymer layers and the adhesive are described above. In one embodiment, the adhesive is covered by a release coated liner. U.S. Pat. No. 4,837,088 describes methods of coextrusion and means of making the multilayer labels. This reference is incorporated by reference.

In one embodiment, the multilayer label is free of paper layers, such as paper facestock except that the release liner may be paper. In another embodiment, no adhesive is between the heat sealable layer and the upper surface of the polymeric film layer (layer 12 above).

Figure 2:
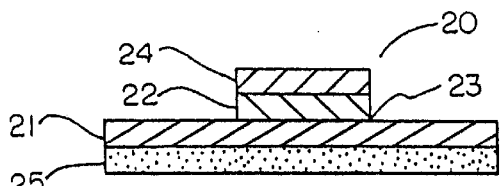
FIG. 2 is a cross sectional area of a security label which has had partial removal of layers of the label.

In another embodiment, of the invention, a label is prepared as described above and then one or more swaths of the label are removed. FIG. 2 illustrates this aspect of the invention. In FIG. 2, label 20 contains polymeric film layers 21 and 22. The upper surface of layer 21 contacts the lower surface of layer 22 at separation interface 23. Heat sealable polymeric layer 24 is bonded to the upper surface of layer 22. An adhesive layer 25 is formed on the lower surface of layer 21. The swaths are removed so that a portion of layers 22 and 24 are removed which exposes the upper surface of layer 21. The removal of the swaths is accomplished by peeling/cutting tools which removes the heat sealable layer 24 and layer 22. The peeling/cutting method and apparatus are described in PCT Publication WO 93/22116, which is incorporated by reference.

The label of the invention, illustrated in FIG. 2, is prepared by making the multilayer label as described above and placing the label on a peeling and cutting unit which peels a portion of the heat sealable layer 24 and layer 22. Typically the size of the swaths removed from the label are from about 5% to about 50%, or from about 10% to about 40% of the width of the label.

For example, a label measuring 1.5 inches by 5 inches would have about 0.5 inch removed from one or both sides of the label. The label would then have one or two flaps which measure 0.5 inch by 5 inches. The flaps would have layer 21 exposed. When two swaths are removed, a central section measuring 0.5 inch by 5 inches would comprise layers 21, 22 and 24. The swaths are typically removed in the machine direction. An advantage of this aspect is the ability of this label to be placed along the spline of a compact disk. The compact disk spline is typically a corrugated or roughed spline, which makes adhesion of labels difficult. The label with the swaths removed has flaps which may be wrapped around the sides of the compact disk to aid in adhesion of the label.

As described above the invention also relates to an article with the label attached wrapped in packaging material. The label is between the article and the packaging material. The article may be any article and include compact disks, computer software boxes, and pharmaceutical containers. The packaging materials may be any useful polymeric materials which will act to encase the article. In one embodiment, the packaging material is a shrink wrap, especially a two sided heat seal shrink wrap.

Figure 3:
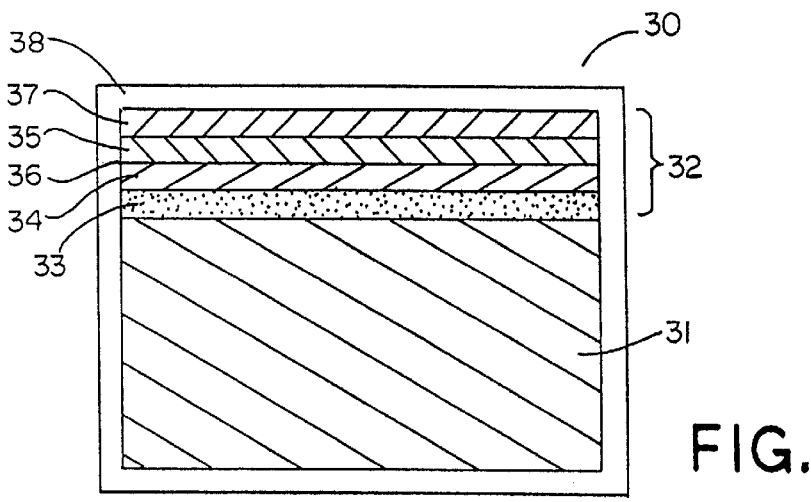
FIG. 3 is a cross sectional area of an article packaged with a packaging material and the temper evident label.

FIG. 3 illustrates an article which is bonded to a multilayer tamper evident label and surrounded by packaging material. In FIG. 3, the overwrapped article 30 contains an article to be wrapped 31 adhered to a label 32 which comprises adhesive layer 33 which is bonded to polymeric layer 34, which in turn contacts polymeric layer 35 at separation interface 36, and heat sealable layer 37 which is bonded to layer 35. Heat sealable layer 37 is bonded to packaging material 38 which in one embodiment is a shrink wrap.

Figure 4:
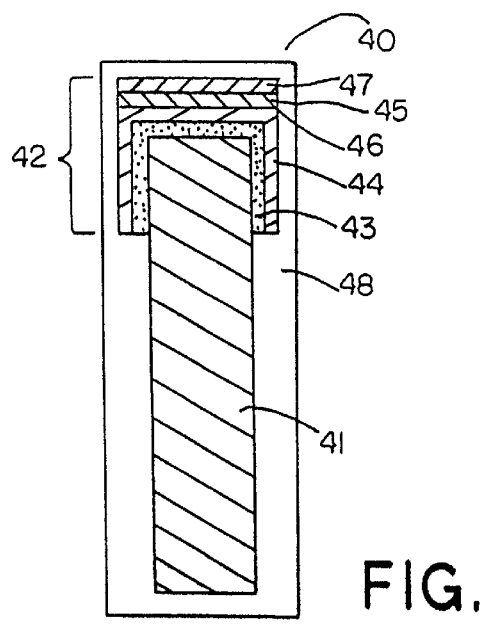
FIG. 4 is a cross sectional area of a compact disk which is packaged using the temper evident label.

FIG. 4 illustrates the packaging of a compact disk. In FIG. 4, the packaged compact disk 40 is viewed from the end of the compact disk package. Compact disk 41 is bonded to a label 42 comprising adhesive layer 43, which is bonded to polymeric layer 44, which in turn contacts polymeric layer 45 at separation interface 46, and heat sealable layer 47. Heat sealable layer 47 is bonded at one surface to layer 45 and on the other surface to packaging material 48, which in one embodiment is a shrink wrap.

In the process of packaging the article, the packaging material overwraps the article. Energy must be provided to bond the heat sealable layer to the packaging material. The energy may be any form sufficient to cause bonding of the heat sealable layer to the packaging material. Typically, thermal, ultrasonic or radio frequency energy is applied to bond the materials. Additionally, the bonding may be caused by tamping the packaging materials over the label with an energy imparting device, such as a thermal boot. When the packaging material is shrink wrap, the energy bonds the shrink wrap to the heat sealable layer and shrinks the wrap around the article.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A multilayer tamper-evident label assembly comprising:
    (A) a first and second layer of coextruded polymeric film, wherein each layer has an upper and lower surface and the lower surface of the first layer contacts the upper surface of the second layer at a separation interface,
    (B) a coextruded heat-sealable layer, having an upper and lower surface, wherein the lower surface of the heat-sealable layer is bonded to the upper surface of the first layer, and
    (C) an adhesive layer, having an upper and lower surface, wherein the upper surface of the adhesive layer is bonded to the lower surface of the second layer,
    (D) a polymeric packaging layer, having an upper and lower surface, wherein the lower surface of the packaging layer is bonded to the upper surface of the heat-sealable layer such that upon removal of said packaging layer from said assembly, said heat-sealable layer and said first polymeric film are caused to be removed at said separation interface.

2. The label of claim 1 wherein the separation interface between the first and second layers has a peel strength in the range of about 30 to about 200 grams per 2-inch width at 90° peel.

3. The label of claim 1 wherein the first and second layers each are independently composed of at least one polyolefin.

4. The label of claim 1 wherein the first and second layers are each independently composed of polyethylene, polypropylene, polypropylene copolymers or mixtures thereof.

5. The label of claim 1 wherein the heat-sealable polymer layer is selected from the group consisting of polyethylene methyl acrylate, polyethylene ethyl acrylate, polymethyl methacrylates, acrylonitrile butadiene styrene polymer, nylon, polybutylene, polystyrene, polyurethane, polysulfone, polyvinylidene chloride, polypropylene, polypropylene copolymers, polycarbonate, polymethylpentene, styrene maleic anhydride polymer, styrene acrylonitrile polymer, ionomers based on sodium or zinc salts of ethylene/methylacrylic, cellulosics, fluoroplastics, polyacrylonitriles, and thermoplastic polyesters.

6. The label of claim 1 wherein the heat sealable layer is composed of a polypropylene copolymer.

7. The label of claim 1 wherein the first layer includes pigments or laser imageable additives.

8. The label of claim 1 further comprising a release liner on the lower surface of the adhesive layer.

9. The label of claim 1 wherein the adhesive layer comprises a pressure-sensitive adhesive.

10. The label of claim 1 wherein the separation interface between the first and second layers has a peel strength in the range of about 50 to about 175 grams per 2-inch width at 90° peel.

* * * * *